United States Patent [19]

Burke

[11] Patent Number: 4,572,633
[45] Date of Patent: Feb. 25, 1986

[54] ONE-SHOT EXPANDABLE CAMERA

[76] Inventor: Thomas E. Burke, 13330 E. 33rd Pl., Tulsa, Okla. 74134

[21] Appl. No.: 661,592

[22] Filed: Oct. 17, 1984

[51] Int. Cl.$^4$ .................... G03B 17/38; G03B 29/00
[52] U.S. Cl. .................................... 354/82; 354/266; 224/257
[58] Field of Search ............... 354/65, 74, 82, 266, 354/268, 180; 224/257

[56] References Cited

U.S. PATENT DOCUMENTS

| | | | |
|---|---|---|---|
| 367,610 | 8/1887 | Fairman | 354/74 |
| 757,825 | 4/1904 | Maul | 354/65 |
| 794,992 | 7/1905 | London | 354/180 |
| 1,007,440 | 10/1911 | Goldstein | 354/180 |
| 2,172,348 | 9/1939 | Githens et al. | 354/82 |
| 4,348,095 | 9/1982 | Suzuki et al. | 354/82 |

Primary Examiner—A. A. Mathews
Attorney, Agent, or Firm—William S. Dorman

[57] ABSTRACT

A light weight, portable camera having a substantially rectangular shape, a case of substantially rectangular shape, the case being hollow and having an internal rectangular recess slightly larger than the camera so as to hold the camera closely therein, an elongated strap connected at one end thereof to the outside of the camera and connected at an opposite end to the outside of the case, a button on the outside of the camera, a snap on the strap spaced from the opposite end thereof for mating with the button and for forming a shorter closed strap loop between the camera and the case and a longer closed strap loop between the snap and the one end of the strap, whereby, when the camera is inserted into the case the shorter strap loop is positioned in folded condition between the outside of the camera and the inside of the case to hold the camera and case snuggly together, the longer strap loop supporting the camera and case around the neck of a person, a lens in the camera, a shutter in the camera in alignment with the lens and adapted to be tripped and to expose a film in the camera from light passing into the camera through the lens upon the tripping of the shutter, a releasable and resettable shutter tripping mechanism mounted within the camera, a spring mounted switch having an outer end extending outwardly through an opening in the camera and resiliently engaging the inside of the case when the camera is positioned within the case, the switch having an inner end engagable with the shutter tripping mechanism when the latter has been reset and when the outer end of the switch is resiliently engaging the inside of the case, whereby, when the case is pulled away from the camera, the case will first fully expose the lens and the switch will thereafter pass out of contact with the inside of the case to release the shutter tripping mechanism to trip the shutter and take a picture. When the case is fully removed from the camera, the two closed strap loops will be eliminated.

5 Claims, 8 Drawing Figures

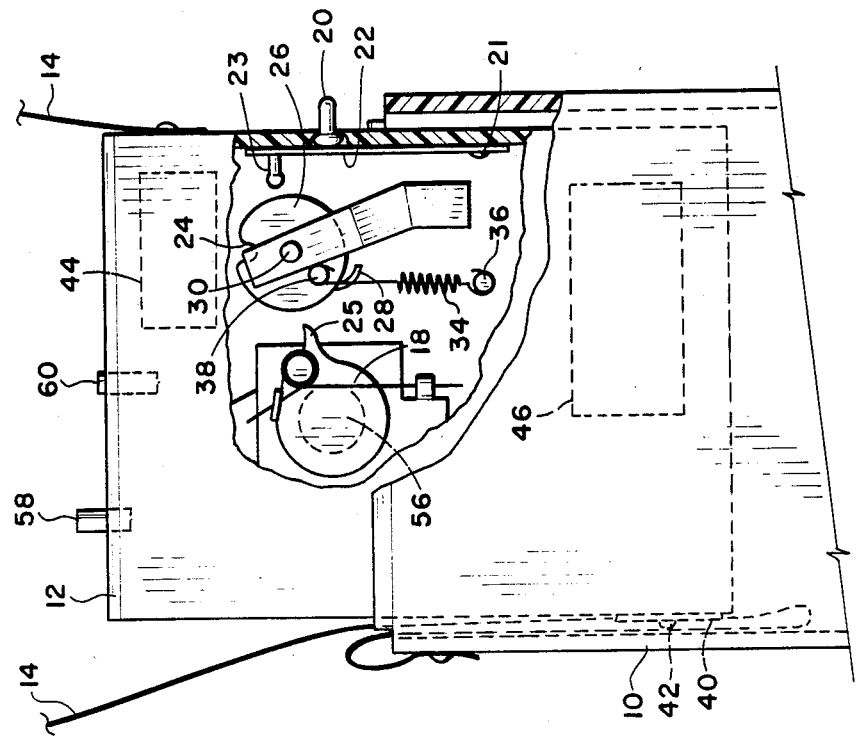
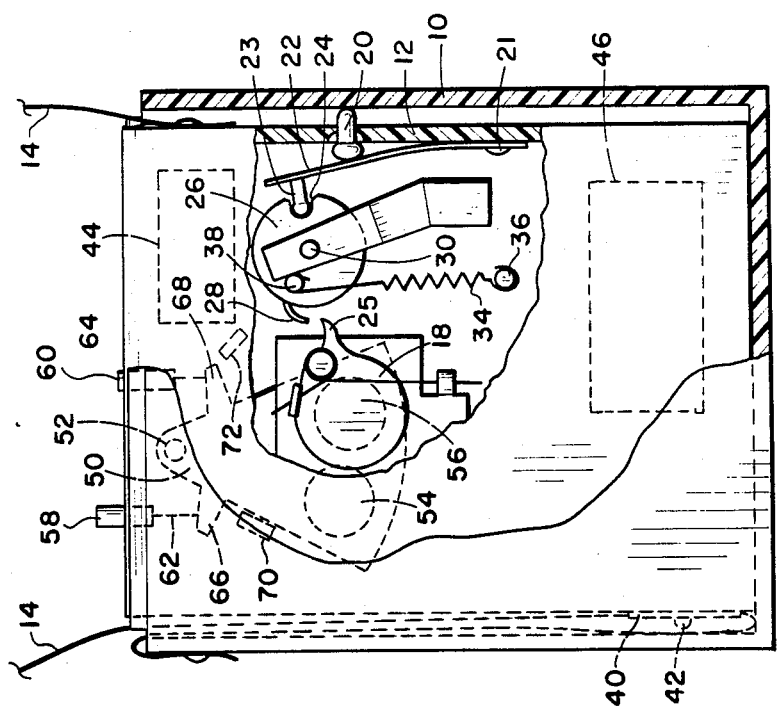

ONE-SHOT EXPANDABLE CAMERA

BACKGROUND OF THE INVENTION

1. Field of the Invention

The present invention relates to a single shot camera and, more particularly, to a camera which is suspended from the ends of a strap encircling the neck of the user or photographer and adapted to take a picture as the user removes the case from the camera.

2. Brief Description of the Prior Art

The present invention is useful in two somewhat unrelated areas; first of all, as will appear below, the light, portable, one-shot camera of the present invention can be used by children, women or older people who are generally considered to be easy "targets" for criminals in places where crimes against the person are likely to be committed; secondly, this same light, portable, one-shot camera can be used to advantage by sky divers.

With regard to the possible victims of crime as referred to above, if the child, woman or older person had a camera of the present invention around his or her neck, he or she would be provided with a measure of psychological or actual protection not previously available. That is, when approached by a person apparently intent upon inflicting harm, the child, woman or older person need merely pull down on the camera case, automatically taking a picture with the camera. Since the camera is initially hanging down in front of the wearer, the picture will be that of the possible criminal. The camera and case will now be hanging at opposite ends of the strap, so the child, woman or older person should then fling the camera as far as he or she can away from this other person, and then run as fast as possible in the opposite direction. The putative criminal now has two choices: he can go after the potential victim or he can go after the camera. Since his principal concern is in not getting "caught", he will normally go after the camera, thus allowing the potential victim to escape. To the extent that the putative criminal obtains the camera, then it becomes "expendable" from the standpoint of the person who was "wearing" the same up to that time.

Sky divers have difficulty taking pictures when they are plumetting earthward over a hundred miles an hour. The conventional cameras are heavy and cumbersome. These cameras are sometimes difficult to aim properly at an object to be photographed. The present invention provides a one-shot camera which is light, portable and which may also be provided with a wide angle lens. As far as the use in connection with sky divers is concerned, the camera of the present invention is not necessarily "expendable."

A preliminary patentability search was conducted in relation to the present invention and the following patents were uncovered in the search:

| Inventor | U.S. Pat. No. | Date |
| --- | --- | --- |
| Fairman | 367,610 | August 2, 1887 |
| Maul | 757,825 | April 19, 1904 |
| London et al | 794,992 | July 18, 1905 |
| Goldstein | 1,007,440 | October 31, 1911 |
| Githens et al | 2,172,348 | September 12, 1939 |

The patents to Fairman and Maul relate to aerial photography broadly but do not show or suggest the present invention. The patent to London et al relates to a plate holder for a camera and is not believed to be pertinent. The patent to Goldstein relates to a photographic magazine camera and is not believed to be pertinent. The patent to Githens et al shows a camera and strap arrangement but is not believed to be pertinent to the present invention.

SUMMARY OF THE INVENTION

The present invention involves a light weight, portable camera of substantially rectangular shape adapted to be received in a case of similar rectangular shape. The camera case is hollow but is open at one end to provide access to an internal rectangular recess slightly larger than the camera so as to hold the camera closely therein. An elongated strap is connected at one end to the outside of the camera and at its opposite end to the outside of the case. A button is mounted on the outside of the camera, and a snap is mounted on the strap spaced from the case end of the strap. The snap engages with the button for forming a shorter loop between the camera and the case and a longer strap loop between the button and the camera. When the camera is inserted into the case, the shorter strap loop is positioned in folded condition between the outside of the camera and the inside of the case to hold the camera and case snuggly together. The longer loop provides a means for supporting the camera and case around the neck of a person, such as a child, a woman or a person who might be elderly or infirm. Another type of person who might use the invention to advantage could be a sky diver. The camera also includes a lens, a shutter in alignment with the lens and adapted to be tripped to expose a film in the camera from light passing into the camera through the lens. A releasable and resettable shutter tripping mechanism is mounted within the camera, together with a spring mounted switch having an outer end extending through an opening in the camera and resiliently engaging the inside of the case when the camera is positioned within the case. The switch has an inner end engagable with the shutter tripping mechanism when the latter has been reset and when the outer end of the switch is resiliently engaging the inside of the case, whereby, when the case is pulled away from the camera, the case will first fully expose the lens and the switch will thereafter pass out of contact with the inside of the case to release the shutter tripping mechanism to trip the shutter and take a picture.

BRIEF DESCRIPTION OF THE DRAWINGS

FIG. 7 is a rear view, on an enlarged scale and with certain parts broken away to show details, of the same camera and case combination shown in FIG. 3; and FIG. 8 is a rear view, on an enlarged scale and with certain parts broken away to show details, of the same camera and case combination shown in FIG. 4.

DETAILED DESCRIPTION OF THE PREFERRED EMBODIMENTS

Figure 1:
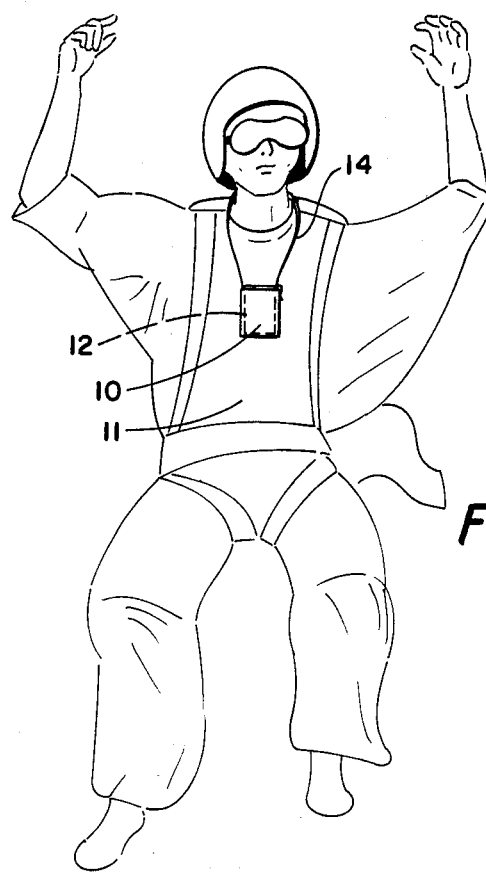
FIG. 1 is a frontal view of a person, in this particular case a sky diver, "wearing" the camera of the present invention.
Figure 5:
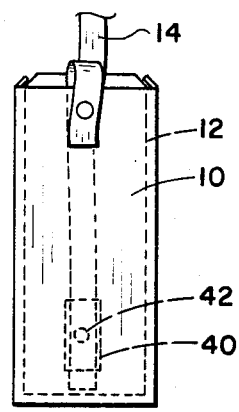
FIG. 5 is a right side view of the invention taken from the right side of FIG. 3 as viewed along the line 5—5.
Figure 6:
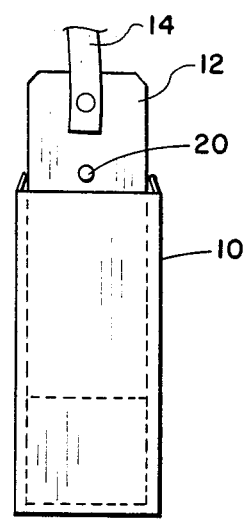
FIG. 6 is a left side view of the invention taken from the left side of FIG. 4 as viewed along the line 6—6.

Referring to the drawings in detail, FIG. 1 shows a rectangular or box-shaped camera 12 enclosed within a similarly shaped and removable case 10 which can be supported around the neck of a sky diver 11 by means of a strap 14. Purely for purposes of information, the camera 12 is preferably approximately two inches high, one and three quarters inch wide and three quarters of an inch in thickness. The case 10 will be slightly larger in all three directions to receive the camera 12 therein and also to receive a folded portion of the strap 14 between one side of the camera and one side of the case when the camera is received within the case as will appear hereinafter. Although the wearer (photographer) of the camera 12 is shown in FIG. 1 as a "sky diver", it should be understood that the wearer could be a child, a woman, an older person or any individual who might wish to avail himself or herself of the use of this invention as a means of protection against possible harm from potential criminals.

Figure 2:
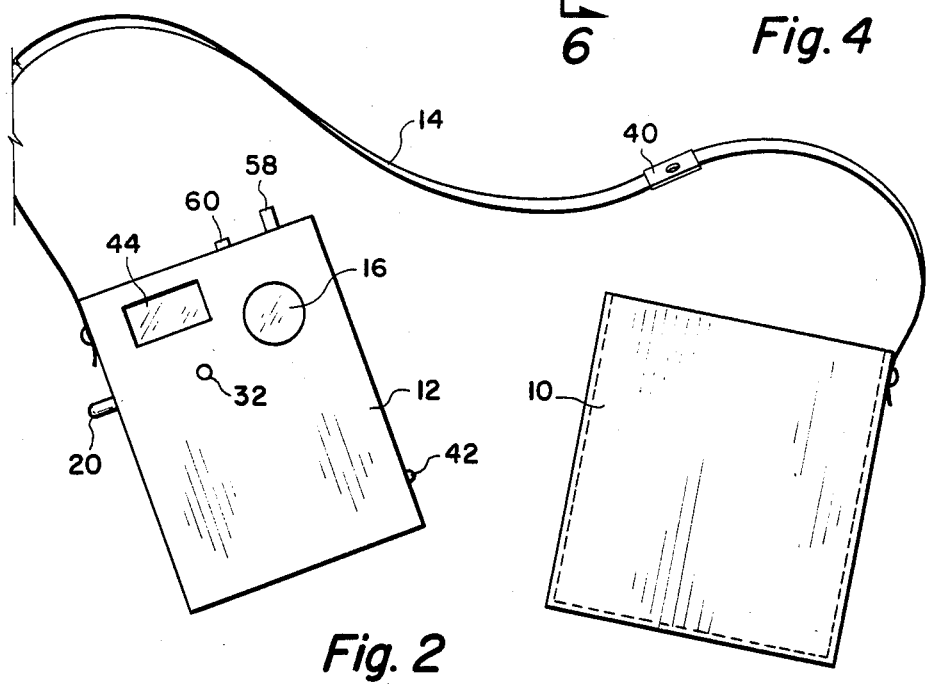
FIG. 2 is a front elevation of the camera and case of the present invention showing these elements in a separated condition but connected together by means of a strap which also forms a part of the invention.

Referring now to FIGS. 2, 7 and 8, the camera 12 is provided with a lens 16 (preferably a wide angle lens especially in the case of use by a sky diver) which is positioned opposite a shutter 18 and in alignment with the film (not shown). It should be understood that any convenient film holder (not shown) having film supported thereon would be mountable in the camera opposite the shutter 18 in a conventional manner. If desired, a slot (not shown) could be provided along the bottom of the camera 12 to permit removal (and insertion) of the film and film holder for processing the film in a dark room.

Figure 3:
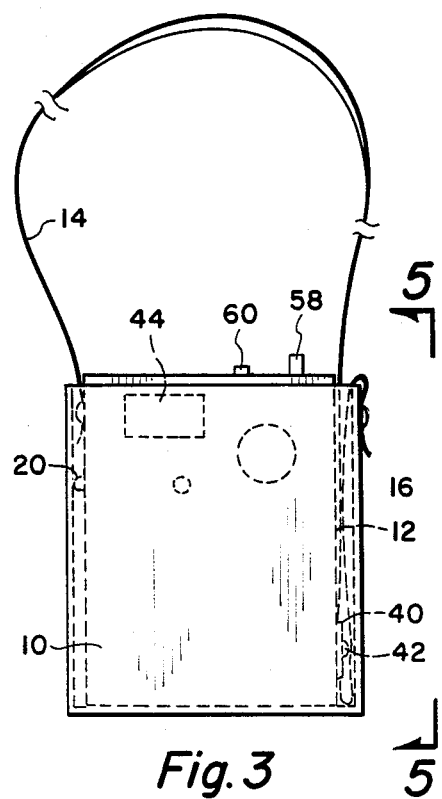
FIG. 3 is a front elevation of the camera and case of the present invention showing the camera (partly in dotted lines) received within the case but still connected together by means of the strap.

The camera 12 is provided with a shutter switch 20 having a cylindrical button which projects outwardly from a hole in one side of the camera 12 but which is held in a depressed condition when the case or cover 10 is received over the camera as shown in FIGS. 3 and 7. When the shutter mechanism is reset (as will appear hereinafter) and the switch 20 is depressed, the left-hand ball-shaped end of the switch 20 (as it appears in FIG. 7) engages the mid section of a leaf spring 22 whose lower end is secured to the inside of the camera 12 by means of a rivet 21 and whose upper end carries a finger 23 which is received in a notch 24 in a shutter wheel 26. A radially outwardly projecting finger 28 is provided on the wheel 26 and this finger is adapted to engage an arm 25 on the shutter 18 to trip the same when the wheel 26 rotates. The leaf spring 22 is adapted to urge the switch 20 outwardly from the camera and the finger 23 outwardly away from engagement with the wheel 26 when the case 10 is removed from the camera 12.

For the purpose of resetting the shutter mechanism, a shaft 30 on which the wheel 26 is mounted is provided with an external portion 32 which is adapted to receive the head of a Phillips head screw driver or a key (not shown) to turn the wheel 26 against the action of a spring 34 until the notch 24 is in alignment with the finger 23; at this time, the switch 20 is depressed and the camera 12 is slipped into the case 10 while maintaining pressure on the switch until the latter is in contact with the inner surface of the case 10. Naturally, the camera must be reloaded with fresh film and therefore, this recocking of the shutter can take place within the dark room. Of course, the shutter mechanism can be reset outside of the dark room, but the camera should be reloaded with film in a dark room.

The spring 34 referred to above extends between a fixed lug 36 mounted within the camera and a radial lug 38 mounted on the wheel 26. The ends of the spring 34 are looped around these lugs. When the camera is removed from the case 10, the finger 23 will move out of the notch 24 and the wheel 26 will rotate rapidly under the action of the spring 34. The projecting finger 28 on the wheel will contact the arm 25 on the shutter 18 to trip the same. The shutter 18 is considered to be conventional and will open and close rapidly and automatically in a conventional manner after it has been tripped.

Figure 4:
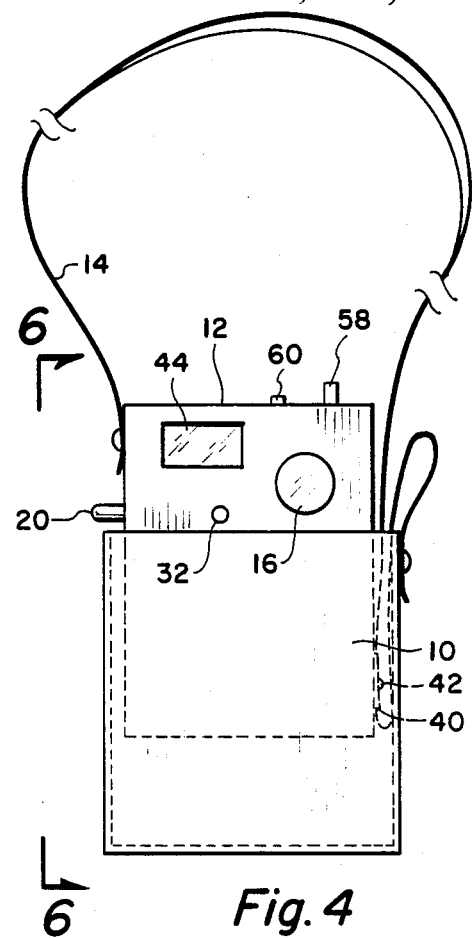
FIG. 4 is a front elevation of the camera and case of the present invention similar to FIG. 3 showing the camera partly removed from the case and still connected together by means of the strap but with the camera in the picture-taking mode.

The strap 14 is somewhat longer than it actually appears in FIG. 2 and this strap 14 is provided with a snap 40 which is adapted to engage a button 42 on the side of the camera 12. When placing the camera and cover arrangement in the closed position shown in FIG. 3, the button 42 and snap 40 are engaged and the cover 10 is placed over the camera 12 while depressing the switch 20. The slack in the strap 14 between the snap 40 and the case 10 is disposed at the right hand side of the camera 12 between the camera and the case 10 as shown in FIGS. 3 and 4 or at the left hand side of the camera as indicated in FIGS. 7 and 8. The thus-folded portion of the strap between the camera and the case will provide enough friction or resistance to prevent the camera from coming out of the case in the absence of an affimative downward pull on the case 10.

It may be desirable to provide the camera described above with a flash attachment and a filter system as optional features. Therefore, the camera 12 shown in FIGS. 2, 3, 4, 7 and 8 may include a flash component 44 which can be mounted within the camera 12 in a conventional manner and which will operate in a conventional manner from a small battery 46 which can be mounted also within the camera 12. The flash component will be triggered in a conventional manner by the rotation of the wheel 26; for example, the projecting finger 28 could engage a contact or trip a switch (not shown) on or adjacent the flash component 44 as it rotates towards engagement with the arm 25 to provide a momentary pulse of electrical energy from the battery 46. These matters are considered to be conventional as stated above and are, therefore, not further to be described.

If (especially in the case of the sky diver) it is desired to provide a variable filter arrangement, a pie-shaped plate 50 can be pivotally mounted within the camera 12 by means of the pivot pin 52. Near the bottom of this plate would be mounted two circular filters 54 and 56 (of differing filter characteristics) adapted to be placed alternately behind the lens 16. Two spring actuated plungers 58 and 60 would be mounted on the upper end of the camera 12 and would have downwardly extenting legs 62 and 64 adapted to engage ears 66 and 68 on the plate 50. Internal stops 70 and 72 would limit the arcuate movement of the plate 50. As shown in FIGS. 7 and 8 the filter 56 is located behind the lens 16 (not shown in the figure). Assuming that the characteristics of filter 54 would now be preferable to those fo filter 56, one merely depresses the plunger 58 downwardly and the plate 50 would move in a counter-clockwise direction until the right hand side thereof came in contact with the stop 72 at which time the filter 54 would now be in alignment with the lens 16.

With regard to the possible victims of crime as described earlier, if the child, woman or older person had a camera of the present invention around his or her neck, he or she would be provided with a measure of psychological or actual protection not previously available. That is, when approached by a person apparently intent upon inflicting harm, the child, woman or older person need merely pull down on the camera case 10, automatically taking a picture with the camera 12. Since the camera is hanging down in front of the wearer, the picture will be that of possible criminal. The camera 12 and case 10 will now be hanging at opposite ends of the strap 14, so the child, woman or older person should then fling the camera as far as he or she can away from this person, and then run as fast as possible in the opposite direction. The putative criminal now has two choices: he can go after the potential victim or he can go after he camera. Since his principal concern is in not getting "caught", he will normally go after the camera, thus allowing the potential victim to escape.

When the sky diver is diving through the air and wishes to take a picture, he merely pulls the case or cover 10 downwardly slightly with respect to the camera until the lens 16 is exposed at which time the switch 20 will spring out and cause the shutter to be tripped. If he wishes to remove the entire camera and case combination from around his neck he pulls the case 10 down further to cause the snap 40 and button 42 to disengage and the loose arrangement shown in FIG. 2 is then obtained.

Both the camera and case of the present invention can be made of light weight plastic material. As such, the camera and case are easily portable. Furthermore, the camera and case will be relatively inexpensive to manufacture.

Whereas the present invention has been described in particular relation to the drawings attached hereto, it should be understood that other and further embodiments, apart from those shown or suggested herein, may be made within the spirit and scope of this invention.

What is claimed is:

1. A light weight, portable camera having a substantially rectangular shape, a case of substantially rectangular shape, the case being hollow and having an internal rectangular recess slightly larger than the camera so as to hold the camera closely therein, an elongated strap connected at one end thereof to the outside of the camera and connected at an opposite end to the outside of the case, a strap engaging means on the outside of said camera, means on said strap spaced from said opposite end thereof for mating with said strap engaging means and for forming a shorter closed strap loop between the camera and the case and a longer closed strap loop between said strap engaging means and said one end of said strap, whereby, when the camera is inserted into the case the shorter strap loop is positioned in folded condition between the outside of the camera and the inside of the case to hold the camera and case snuggly together, the longer strap loop providing a means for supporting the camera and case around the neck of a person, a lens in said camera, a shutter in said camera in alignment with said lens and adapted to be tripped and to expose a film in said camera from light passing into said camera through said lens upon the tripping of said shutter, a releasable and resettable shutter tripping mechanism mounted within said camera, a spring mounted switch having an outer end extending outwardly through an opening in said camera and resiliently engaging the inside of said case when said camera is positioned within said case, said switch having an inner end engagable with said shutter tripping mechanism when the latter has been reset and when the outer end of said switch is resiliently engaging the inside of said case, whereby, when the case is pulled away from said camera, the case will first fully expose said lens and said switch will thereafter pass out of contact with the inside of the case to release said shutter tripping mechanism to trip said shutter and take a picture.

2. A light weight, portable camera as set forth in claim 1 wherein said spring mounted switch has an outer end comprising a cylindrical button which projects outwardly from a hole in one side of the camera and an inner end which comprises a ball-shaped member, a leaf spring having a lower end secured to the inside of the camera and an upper end which carries a notch-engaging finger, the ball-shaped member contacting the mid-section of the leaf spring, a shutter wheel rotatably mounted within said camera and having a notch adapted to receive the notch-engaging finger on said leaf spring when said shutter wheel has been reset, a cocking spring extending between a fixed lug mounted within the camera and a radial lug mounted on the shutter wheel, a radially outwardly projecting finger mounted on the wheel and adapted to engage an arm on the shutter to trip the same when the wheel rotates, the shutter wheel being reset by rotating the same against the action of the cocking spring while simultaneously depressing the switch button until the notch-engaging finger is received in the notch, the camera now being inserted into the case while holding the switch button in depressed condition.

3. A light weight, portable camera as set forth in claim 1 wherein said camera is provided with an internal flashing component which is actuated upon the removal of the case from the camera.

4. A light weight, portable camera as set forth in claim 1 wherein said camera is provided with a plurality of filters adapted to be placed alternately behind the lens.

5. A light weight, portable camera as set forth in claim 1 wherein, when the case is fully removed from the camera, the two closed strap loops will be eliminated and the case will be connected only to the other end of the strap and the camera will be connected only to the one end of the strap, whereby the camera and case can be flung away from the wearer without the necessity of lifting a closed loop of the strap over the neck of the wearer.

* * * * *